US012047029B2

(12) United States Patent
Anderson

(10) Patent No.: US 12,047,029 B2
(45) Date of Patent: Jul. 23, 2024

(54) ELECTRICITY GENERATION SYSTEM AND METHOD

(71) Applicant: Eric Robert Anderson, Tuckerton, NJ (US)

(72) Inventor: Eric Robert Anderson, Tuckerton, NJ (US)

(*) Notice: Subject to any disclaimer, the term of this patent is extended or adjusted under 35 U.S.C. 154(b) by 0 days.

(21) Appl. No.: 17/399,465

(22) Filed: Aug. 11, 2021

(65) Prior Publication Data
US 2022/0077812 A1    Mar. 10, 2022

Related U.S. Application Data

(60) Provisional application No. 63/076,751, filed on Sep. 10, 2020.

(51) Int. Cl.
| H02S 10/12 | (2014.01) |
| F03D 9/00 | (2016.01) |
| H02S 10/20 | (2014.01) |
| H02S 40/32 | (2014.01) |
| H02S 40/34 | (2014.01) |
| H02S 50/00 | (2014.01) |

(52) U.S. Cl.
CPC .............. *H02S 10/12* (2014.12); *F03D 9/007* (2013.01); *H02S 10/20* (2014.12); *H02S 40/32* (2014.12); *H02S 40/34* (2014.12); *H02S 50/00* (2013.01); *F05B 2220/708* (2013.01)

(58) Field of Classification Search
CPC .......... H02S 10/12; H02S 10/20; H02S 40/32; H02S 40/34; H02S 50/00; F03D 9/007; F03D 9/11; F05B 2220/708; Y02E 10/76; Y02E 70/30
See application file for complete search history.

(56) References Cited

U.S. PATENT DOCUMENTS

| 3,892,433 | A | | 7/1975 | Blake | |
| 4,033,126 | A | | 7/1977 | Newland | |
| 4,189,922 | A | | 2/1980 | Bellofatto | |
| 4,379,972 | A | * | 4/1983 | Sosa | F03D 9/34 290/55 |
| 4,636,931 | A | * | 1/1987 | Takahashi | H02J 7/35 363/71 |
| 4,922,557 | A | * | 5/1990 | Harding | E03D 9/052 4/321 |
| 5,131,888 | A | * | 7/1992 | Adkins, II | F24F 7/013 454/343 |
| 6,306,030 | B1 | * | 10/2001 | Wilson | F23L 17/10 454/16 |
| 6,550,248 | B1 | | 4/2003 | Sangster | |

(Continued)

*Primary Examiner* — Pedro J Cuevas
(74) *Attorney, Agent, or Firm* — Barclay Damon LLP

(57) ABSTRACT

A system includes a solar panel unit comprising at least one solar panel connected to a respective molten salt cell, a wind motor unit comprising at least one wind motor that is powered by the solar panel unit, each wind motor having a channel, a turbine unit comprising at least one turbine, each turbine associated with a respective wind motor via the channel, the turbine unit powered by the wind motor unit, a first battery receiving and storing power generated by the turbine unit to be used by the system, a second battery receiving and storing power generated by the turbine unit for use outside of the system, and a housing that protects at least the wind motor unit and the turbine unit.

19 Claims, 8 Drawing Sheets

(56) References Cited

U.S. PATENT DOCUMENTS

| | | | | |
|---|---|---|---|---|
| 7,866,958 B2* | 1/2011 | Patel | F04D 25/06 |
| | | | 417/423.15 |
| 8,288,884 B1 | 10/2012 | Malcolm | |
| 8,368,240 B1 | 2/2013 | Burkett | |
| 8,369,997 B2* | 2/2013 | Valin | G07F 15/008 |
| | | | 700/286 |
| 8,423,199 B2* | 4/2013 | Kalen | H01M 10/465 |
| | | | 700/297 |
| 8,432,053 B2 | 4/2013 | Frayne | |
| 8,600,572 B2* | 12/2013 | Sri-Jayantha | G06Q 10/04 |
| | | | 702/57 |
| 8,622,056 B2 | 1/2014 | Bohl | |
| 8,739,533 B2 | 6/2014 | Yogev | |
| 8,820,074 B2 | 9/2014 | Aggarwal | |
| 8,872,379 B2* | 10/2014 | Ruiz | H02J 13/00028 |
| | | | 307/66 |
| 9,182,138 B2* | 11/2015 | Foreman | F24F 11/56 |
| 9,244,446 B2* | 1/2016 | Bhageria | G05B 17/02 |
| 9,581,051 B2 | 2/2017 | Hansson | |
| 9,605,661 B2 | 3/2017 | Aga | |
| 9,797,380 B2 | 10/2017 | Burkett | |
| 9,923,416 B2* | 3/2018 | Bhageria | H02J 13/00017 |
| 10,228,125 B2 | 3/2019 | Davies | |
| 10,352,973 B2* | 7/2019 | Egedal | H02J 3/381 |
| 10,597,895 B1* | 3/2020 | Daniels | A01K 1/00 |
| 10,720,794 B2* | 7/2020 | Bhageria | H02J 13/00 |
| 11,011,913 B2* | 5/2021 | Smith | H02J 3/381 |
| 11,251,620 B2* | 2/2022 | Cai | G05B 13/0265 |
| 11,271,400 B2* | 3/2022 | Yabe | H02J 3/14 |
| 11,326,793 B2* | 5/2022 | Daniels | E04D 1/30 |
| 11,342,790 B2* | 5/2022 | Bhageria | H02J 13/00 |
| 11,663,496 B2* | 5/2023 | Kim | F03D 17/00 |
| | | | 702/181 |
| 11,912,144 B2* | 2/2024 | Wheatley | B60L 53/52 |
| 2005/0074292 A1* | 4/2005 | Brookshire | B09B 1/00 |
| | | | 405/129.95 |
| 2008/0152482 A1* | 6/2008 | Patel | F04D 25/084 |
| | | | 415/121.3 |
| 2011/0040418 A1* | 2/2011 | Kalen | H01M 10/46 |
| | | | 700/291 |
| 2011/0204720 A1* | 8/2011 | Ruiz | H02J 3/322 |
| | | | 307/66 |
| 2011/0217194 A1* | 9/2011 | Randall | F24F 7/02 |
| | | | 454/251 |
| 2011/0270682 A1* | 11/2011 | Valin | G06Q 40/04 |
| | | | 705/37 |
| 2011/0307109 A1* | 12/2011 | Sri-Jayantha | G06Q 10/04 |
| | | | 700/291 |
| 2012/0023942 A1 | 2/2012 | Gaona | |
| 2012/0045983 A1* | 2/2012 | Eskola, III | F24F 7/025 |
| | | | 454/341 |
| 2012/0178357 A1* | 7/2012 | Rheaume | F04D 25/0613 |
| | | | 454/343 |
| 2012/0228963 A1 | 9/2012 | Ursu | |
| 2012/0252348 A1* | 10/2012 | Rheaume | H02S 20/23 |
| | | | 29/897.3 |
| 2014/0130846 A1 | 5/2014 | Kwon | |
| 2014/0148960 A1* | 5/2014 | Bhageria | H02J 13/00028 |
| | | | 700/286 |
| 2014/0176337 A1* | 6/2014 | Valin | H02J 3/381 |
| | | | 340/870.02 |
| 2014/0202155 A1 | 7/2014 | Ota | |
| 2015/0079896 A1* | 3/2015 | Stocker | F24F 7/025 |
| | | | 454/338 |
| 2015/0344324 A1* | 12/2015 | O'Donnell | C02F 1/14 |
| | | | 210/175 |
| 2016/0049830 A1* | 2/2016 | Bhageria | H02J 3/001 |
| | | | 700/286 |
| 2016/0327291 A1* | 11/2016 | Bazan, Jr. | F24F 5/0046 |
| 2018/0109137 A1* | 4/2018 | Bhageria | H02J 3/00 |
| 2018/0262003 A1* | 9/2018 | Yabe | H02J 3/004 |
| 2019/0236456 A1* | 8/2019 | Kim | H02S 50/00 |
| 2020/0200411 A1* | 6/2020 | Daniels | E04D 1/30 |
| 2020/0244071 A1* | 7/2020 | Smith | H02J 3/38 |
| 2020/0313430 A1* | 10/2020 | Bhageria | H02J 13/00017 |
| 2020/0341439 A1* | 10/2020 | Valin | H02S 40/44 |
| 2020/0370770 A1* | 11/2020 | Jacobus | F24F 7/013 |
| 2021/0188105 A1* | 6/2021 | Wheatley | H02S 10/12 |
| 2021/0281077 A1* | 9/2021 | Cai | G06Q 50/06 |
| 2022/0099317 A1* | 3/2022 | Mantyla | F24F 7/025 |
| 2022/0179381 A1* | 6/2022 | Carrasco Schmidt | H02J 3/381 |
| 2022/0247342 A1* | 8/2022 | Sharma | F03D 9/007 |
| 2022/0260266 A1* | 8/2022 | Daniels | F24F 7/02 |
| 2022/0311272 A1* | 9/2022 | Bhageria | H02J 13/00017 |
| 2022/0371449 A1* | 11/2022 | Woodward | F03D 9/32 |

* cited by examiner

ELECTRICITY GENERATION SYSTEM AND METHOD

CROSS-REFERENCE TO RELATED APPLICATION

This application claims the benefit of U.S. Provisional Application No. 63/076,751 filed Sep. 10, 2020, entitled "24/7/365 electricity generation system. A system to create electricity off-the-grid owned by consumers," the entire contents of which is incorporated herein by reference.

FIELD

The present disclosure is directed generally to continuous, nonstop electricity generation.

BACKGROUND

Current independent sources of electricity owned and operated by consumers are unable to sustain continuous electricity generation. Additionally, for consumers that are connected to power grids, utility companies are plagued by power outages and are unable to provide timely support when a consumer's power is to be restored.

The utility companies' costs to generate and provide power continue to increase and these costs have been passed on to consumers. Although the costs continue to rise, the power grid is not reliable and reliability has been decreasing. Recently, widespread power outages have struck many different locations in the United States and consumers were without power for a long period of time. As an example, Texas experienced extremely cold temperatures and the power grid collapsed under the heavy usage. Utility companies were incapable of solving the problems with the grid and were unable to determine how long power would be unavailable. More than 4.5 million homes and business were without power for an indefinite period of time. The electric grid in the United States is in desperate need of revitalization and improvement but the financial costs to make such improvements are simply too high. In addition, current off-the-grid solutions are limited at best and have numerous drawbacks.

It is with these issues in mind, among others, that various aspects of the disclosure were conceived.

SUMMARY

The present disclosure is directed to a system and method of continuous, nonstop electricity generation. A system may include a solar panel unit having one or more solar panels that may collect and generate solar energy. Each of the one or more solar panels may have an associated molten salt capture bin. The solar energy may be converted to electrical energy and provided to a wind motor unit having one or more wind motors that have one or more fans. Each of the one or more wind motors may generate artificial wind energy that may be provided to a turbine unit having one or more turbines. The wind energy may be directed through a channel associated with each of the wind motors to a respective turbine. Each turbine may generate turbine energy that may be converted into a format for storage in a first battery and/or a second battery. A diagnostic unit may be used to obtain real-time information associated with the solar panel unit, the wind motor unit, the turbine unit, the first battery, and the second battery. The real-time information may be transmitted by the diagnostic unit to at least one computing device. In addition, the energy stored in the first battery and/or the second battery may be converted into electrical energy and sent to a junction box in a home or other location. The energy stored in the first battery and/or the second battery also may be shared with an electrical grid.

In one example, a system may include a solar panel unit comprising at least one solar panel connected to a respective molten salt cell, a wind motor unit comprising at least one wind motor that is powered by the solar panel unit, each wind motor having a channel, a turbine unit comprising at least one turbine, each turbine associated with a respective wind motor via the channel, the turbine unit powered by the wind motor unit, a first battery receiving and storing power generated by the turbine unit to be used by the system, a second battery receiving and storing power generated by the turbine unit for use outside of the system, and a housing that protects at least the wind motor unit and the turbine unit.

In another example, a method may include collecting solar energy by a solar panel unit comprising at least one solar panel that is connected to a respective molten salt unit, converting the solar energy using a fan inverter to electrical energy and transmitting the electrical energy to a wind motor unit having at least one wind motor to generate wind energy into a channel, each wind motor having a channel, receiving the wind energy by a turbine unit comprising at least one turbine, each turbine associated with a respective wind motor via the channel, each turbine generating turbine energy based on the wind energy provided by the respective wind motor, storing the turbine energy in a first battery to power the wind motor unit and storing the turbine energy in a second battery to be converted to electrical energy and released to a voltage meter associated with a junction box, and receiving real-time information by a diagnostic unit from the solar panel unit, the wind motor unit, the turbine unit, the first battery, and the second battery and transmitting the real-time information to a server computing device.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
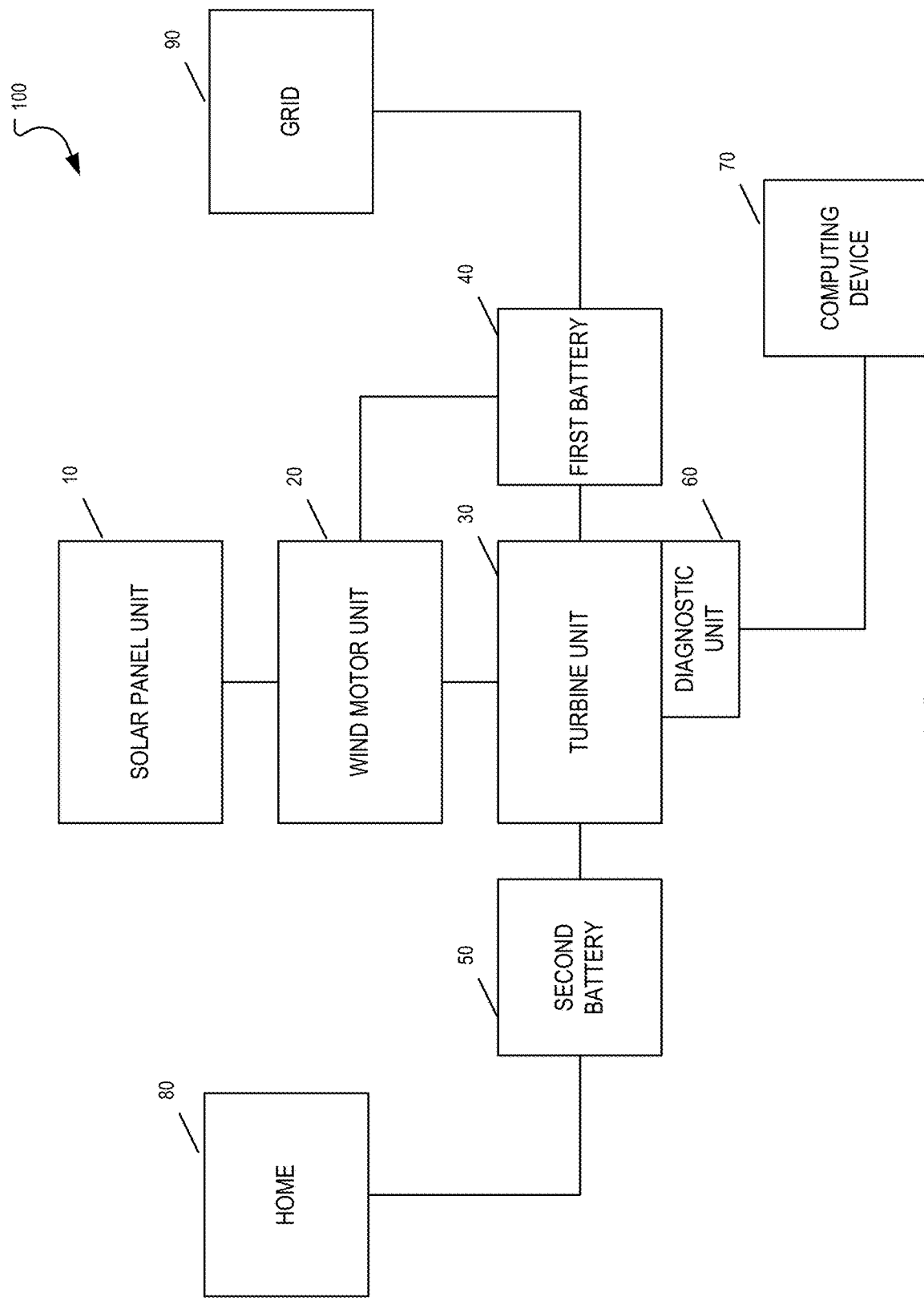
FIG. 1 is a block diagram of an electricity generation system according to an example of the instant disclosure.

Aspects of a system and method for continuous, nonstop electricity generation includes a solar panel unit having one or more solar panels that may collect and generate solar energy. Each of the one or more solar panels may have an associated molten salt capture bin. The solar energy may be converted to electrical energy and provided to a wind motor unit having one or more wind motors that each have one or more fans. Each of the one or more wind motors may generate artificial wind energy that may be provided to a turbine unit having one or more turbines. The wind energy may be directed through a channel associated with each of the wind motors to a respective turbine. Each turbine may generate turbine energy that may be converted into a format for storage in a first battery and/or a second battery. A diagnostic unit may be used to obtain real-time information associated with the solar panel unit, the wind motor unit, the turbine unit, the first battery, and the second battery. In addition, the energy stored in the first battery and/or the second battery may be converted into electrical energy and sent to a junction box in a home or other location. The diagnostic unit also may obtain real-time usage information of the home that receives and uses the electrical energy from the system. The real-time information may be transmitted by the diagnostic unit to at least one computing device. The diagnostic unit is also able to switch from one malfunctioning solar panel, wind motor, or turbine to another and divert power accordingly and proportionally.

Continuous, nonstop electricity generation remains elusive for the average consumer. An electricity generation system is discussed herein that includes a plurality of different aspects that may together provide continuous electricity for a homeowner, apartment dweller, or a commercial building owner, among others. The system discussed herein is able to utilize kinetic and potential power and provide continuous nonstop electricity generation twenty-four hours a day, seven days a week, three-hundred and sixty-five days year. Conventionally, a homeowner or a business may experience regular lapses in service and is unable to find a solution that may provide sustainable power due to environmental, geographic, and structural challenges. Currently, a consumer may have to rely on a renewable electricity system that is unreliable and does not provide the consumer with a guarantee of constant, reliable electricity. Alternatively, the consumer may only have the grid and a single utility company as an option. The consumer may pay a monthly bill and may be solely dependent on the utility company that is subject to outages. The utility company may restore any outages but they may be frequent and long-lasting.

According to the system discussed herein, the consumer may own and operate their electricity system and it may provide continuous, nonstop electricity that is currently unavailable to consumers. Electricity bills may become a thing of the past and additional savings may be provided by the system discussed herein. Gas furnaces may be replaced with electric furnaces, gas stoves may be replaced with electric stoves, gas heaters may be replaced by electric water heaters, and the system may provide electric vehicle charging.

The system discussed herein may include a solar panel unit having one or more solar panels and one or more molten salt capture units. Power or energy may be generated by the one or more solar panels and may be sent to a housing unit having one or more fans. Excess power may be sent to molten salt capture units or cylinders and a battery associated with the housing unit. Power from the solar panels may be used to drive or spin the one or more fans in one or more wind motors in a wind motor unit. The wind generated from the one or more fans may be sent through a canal, channel, or gutter to a turbine in a turbine unit. The turbine may operate or spin to generate power that is received by the battery having one or more cells that may be charged. The battery having the one or more cells may send power to a junction box of a home or other structure. The system may include a diagnostic board that may monitor performance of the system and may send information to a computing device associated with monitoring the system such as a customer service/monitoring computing device that may be a server computing device. The server computing device may transmit or send the information to a client computing device and may be viewed using an application. The system may be protected with a particular shell or housing.

The solar panels associated with the system may utilize the sun to create power or energy that may be sent to the fan units. Excess power may be sent to the molten salt units. Excess power unneeded by the fan units and the molten salt units may be sent to a cell battery. The fans may be operated and may spin using power received from the solar panels and/or the molten salt units. Wind generated by the fans may be sent in a channel to a turbine. The turbine may create power that may be sent to the cell battery. As a result, the cell battery may dispense power to the junction box of the structure.

The diagnostic board may perform one or more functions including monitoring each part or sub-section of the system. Real-time information and data associated with each part or sub-section of the system may be sent to a computing device such as a server computing device over a network or using satellite communication. The real-time information and data may be sent from the server computing device to a client computing device and may be viewed using the application. A user of the client computing device may view the real-time information associated with the system. For example, the user may view real-time performance information for each part or sub-section of the system, power generated and stored by each part or sub-section of the system, and also may view real-time generation and usage information of the system and real-time usage information of the home.

The diagnostic board also may perform a transition in real-time upon a malfunction that may be determined. As an example, if a solar panel stops working or malfunctions, molten salt power may be sent to one or more fans or the cell battery depending on what may yield greater power. If a molten salt unit stops working or malfunctions, an associated solar panel may switch to another or a next molten salt unit and provide power to the next molten salt unit along with the solar panel associated with the molten salt unit. If a fan stops working or malfunctions, power sent to that fan may be sent proportionally to the other fans. If a cell battery stops working or malfunctions, power may be sent to a second or other battery. If more than one battery stops working or fails, power may be sent from the turbines to the junction box proportionate to use of the structure.

In other words, if there is a malfunction at any point or part in the system, the diagnostic board may perform an appropriate function. As an example, if a turbine fails or stops working, the turbine's fan may be shut down and power may be diverted to other fans. As a result, the other fans may spin at a higher speed and a greater spin momentum may be delivered to the associated turbines. If a solar panel malfunctions or stops working, power associated with the molten salt unit may be sent to the wind motor unit or the one or more cell batteries.

The one or more solar panels may be placed on a rooftop or top of a structure or may be located on the ground or land. As an example, the one or more solar panels may be monocrystalline solar panels. Each solar panel may be connected to multiple lines. A first line of output may be provided to one or more fans, a second line of output may be provided to one or more molten salt units, and a third line of output may be provided to one or more cell batteries. The one or more fans may be within a housing unit. As an example, the housing unit may be approximately the size of a refrigerator and have two opposite sets of walls. Each fan may be aligned with a tube, canal, or channel in a lid of the housing having an opening. Wind from the one or more fans may be received by each turbine. In one example, the system may have twenty-eight fans and twenty-eight turbines. Each turbine may provide power to the one or more cell batteries. Each cell battery may store power or energy and may release the power or energy to the junction box of the structure using a gate or switch.

The system may be combined with another system or may be stacked on another system to create a power unit made of a plurality of systems. In addition, the system may be reduced in size and may be a mobile unit that may be more easily transported. The system may be altered in size based on fan size, solar panel size, molten salt unit size, turbine design, a number of turbines, cell battery size or capacity, and/or a number of cell batteries.

The system discussed herein may eliminate dependence on a utility company to provide power and may reduce consumer reliance on the power grid. In addition, the system may reduce power outages and loss of power due to a number of reasons including weather related outages, brownouts, and blackouts. Energy costs may be reduced and use of gas may also be reduced. As noted above, the system may be incorporated into a vehicle and may be used to power the vehicle such as an automobile, an aircraft, or a watercraft. The system also may be mobile and be easily transportable for use by the military in locations that do not have access to a power grid. Each system may be connected to another system to provide additional electricity. As a result, the system may be used by commercial and industrial settings and buildings.

FIG. 1 is a block diagram of a continuous, nonstop electricity generation system 100 according to an example of the instant disclosure. As shown in FIG. 1, the system 100 may include a solar panel unit 10 having one or more solar panels to collect solar energy that may be connected to a wind motor unit 20. Each of the one or more solar panels may be connected to a molten salt capture unit or bin. The solar energy may be converted into electrical energy that may be used to power one or more wind motors of the wind motor unit 20. The one or more wind motors may power or drive one or more turbines of a turbine unit 30. The one or more turbines may generate energy that may be stored in a first battery 40 and/or a second battery 50. The energy stored in the first battery 40 may be used to power the system 100 and/or may be shared with an electrical grid 90. The energy stored in the second battery 50 may be supplied to a home 80 as electrical energy or another structure or used in another way. In addition, the system 100 may include a diagnostic unit 60 that may obtain real-time information associated with the solar panel unit 10, the wind motor unit 20, the turbine unit 30, the first battery 40, and the second battery 50. The diagnostic unit 60 is also able to switch from one malfunctioning solar panel, wind motor, or turbine to another and divert power accordingly and proportionally.

The diagnostic unit 60 may be in communication with at least one computing device 70 via a communication network. The at least one computing device 70 may be a server computing device having at least one processor and may have an application that may be used to monitor the real-time information from the system 100 and send commands to the system 100.

The communication network can be the Internet, an intranet, or another wired or wireless communication network. For example, the communication network 108 may include a Mobile Communications (GSM) network, a code division multiple access (CDMA) network, $3^{rd}$ Generation Partnership Project (GPP) network, an Internet Protocol (IP) network, a wireless application protocol (WAP) network, a WiFi network, a Bluetooth network, a satellite communications network, or an IEEE 802.11 standards network, as well as various communications thereof. Other conventional and/or later developed wired and wireless networks may also be used.

As an example, an equation may be used to determine how to construct and organize the system for a particular location and usage.

Watts/Panel*number of panels/Number of hours of sunlight=Watts/hour=$G$

Number of fans*watts/hour/fan=Total watts/hour/fans=$H$ $G>=H$

Cubic Feet per Minute (CFM) or Miles per Hour (MPH) of a fan may equal its maximum speed rating when total watts required is delivered. If CFM/MPH of a fan is _, then the _ CFM/MPH of a turbine may be _ resulting in _ kHw per turbine=P.

Number of turbines*$P$=Total kWh of the system

Figure 2A:
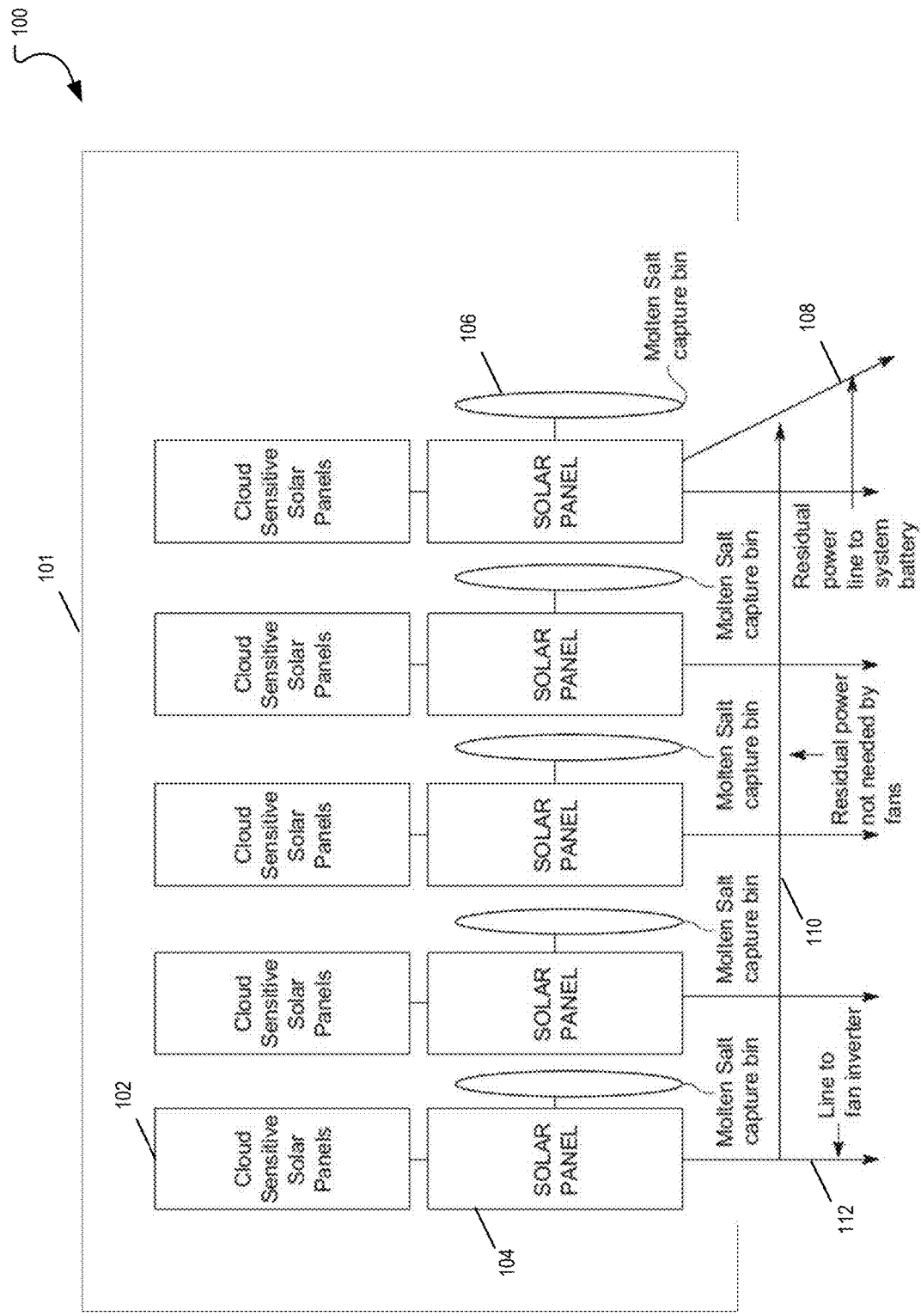
FIG. 2A is a diagram showing the electricity generation system including one or more solar panels according to an example of the instant disclosure.

FIG. 2A illustrates the continuous, nonstop electricity generation system 100 according to an example of the instant disclosure. In particular, FIG. 2A shows a solar panel unit 101. As shown in FIG. 2A, the continuous, nonstop electricity generation system 100 may include one or more solar panels 102, 104. The solar panels 102 may be cloud sensitive solar panels. In one example, the cloud sensitive solar panels may have organic material on the panels to receive the solar energy in cloud cover or at nighttime after the sun sets. In addition, the solar panels 104 for use in daylight may be monocrystalline panels.

Each of the one or more solar panels 102, 104 may be in communication or connected to a molten salt capture unit or bin 106. The residual power generated by the molten salt capture bins 106 and the one or more solar panels 102, 104 may be sent over a power line 108, 110 to one or more system batteries. In addition, the power generated by the one or more solar panels 102, 104 may be sent over a line 112 to a fan inverter to send to one or more wind motors or blowers in a housing.

Energy created by the solar panels 102 may be sent to the one or more wind motors or blowers through one or more inverters that receive the solar energy and convert the solar energy into electrical energy. Excess energy not used by the one or more wind motors may be stored in one or more batteries that may be used to power the system 100. The system may include one or more first batteries to store energy for use by the system 100 and one or more second batteries to store energy for use outside of the system, e.g., by a home or business.

While ten solar panels are shown in FIG. 2A including five solar panels for direct sunlight 104 and five solar panels for cloud cover 102, the number of solar panels of the system 100 may be determined by energy output desired for a particular location, e.g., a particular zip code or a geographic region or state.

As an example, the system 100 in a particular location may utilize between four and eight solar panels 102, 104 to send power to sixteen wind motors and sixteen associated turbines.

Figure 2B:
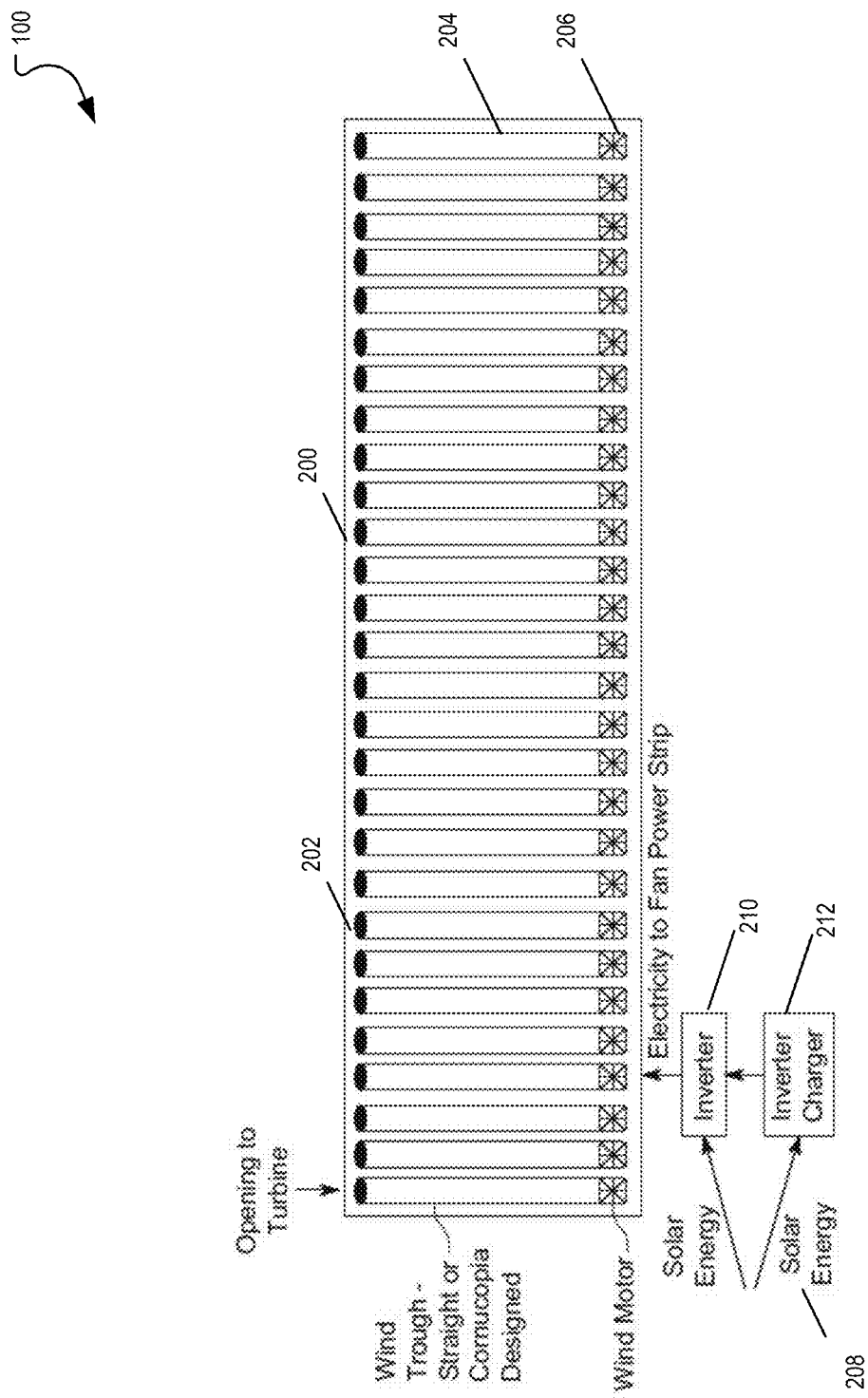
FIG. 2B shows another diagram of the electricity generation system including one or more fans according to an example of the instant disclosure.

FIG. 2B illustrates the continuous, nonstop electricity generation system 100 according to an example of the instant disclosure. In particular, FIG. 2B shows the wind motor unit 200. FIG. 2B shows one or more wind motors 206 that may be at one end of a wind trough or channel 204. The wind trough or channel 204 may have a cornucopia shape, a reverse cornucopia shape, or may be straight. Each of the one or more wind motors 206 may be connected to the fan inverter 210 and may be powered by the solar power or energy 208 that is received by the one or more solar panels 102, 104. The fan inverter 210 may be charged and powered by an inverter charger 212. A second end of the wind trough may have an opening 202 to a respective turbine.

FIG. 2B shows a lid, top, or cover of the system 100. The lid may have the wind motor unit 200 having the one or more wind motors 206 as well as their related channels 204 and openings 202 at the ends of the channels for the artificial wind to travel and be received by the turbine unit having the one or more turbines. Each wind motor 206 has its own channel 204 and a respective turbine 202. As shown in FIG. 2B, there is one or more inverters 210 to receive the solar energy 208 and convert the solar energy to electrical energy. The inverter 210 may modify or convert the solar energy 208 to electrical energy to power the wind motor unit 200 and the one or more wind motors 206.

In addition, FIG. 2B shows an inverter charger 212 to keep the inverter charged using energy from the one or more solar panels 102, 104. The energy released by the one or more solar panels 102, 104 through the inverter 210 may be used to power the one or more wind motors 206 of the wind motor unit 200. Fans of the one or more wind motors 206 may be ganged or spliced together with one another such that energy from the inverter 210 may be sent collectively to one entry point to drive the one or more wind motors each having a fan. Each fan may be similar to a duct fan and have the channel having the opening that is shaped to create a wind force that is greatest as possible to strike and spin each turbine to create and generate a force similar to natural wind.

Figure 3:
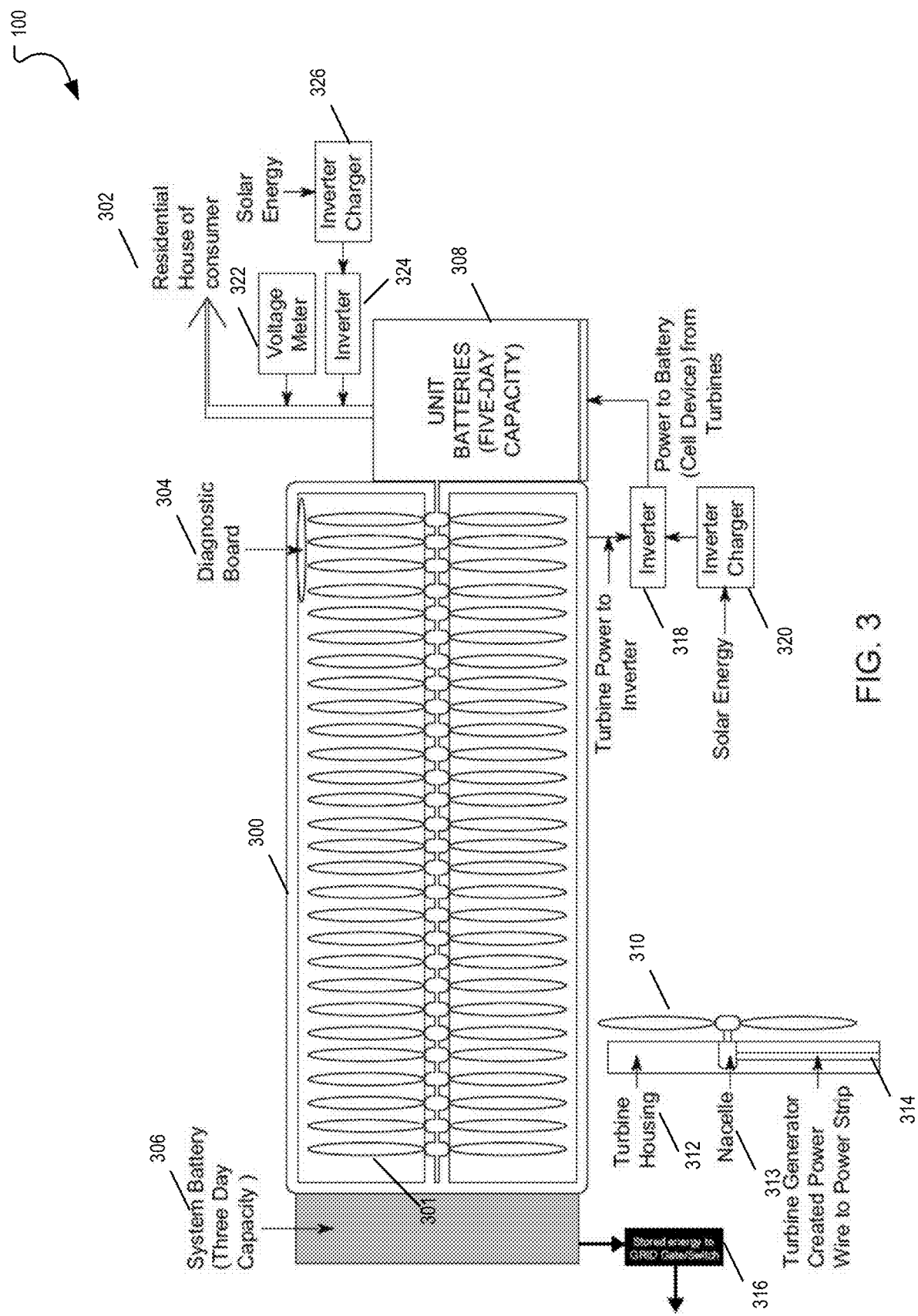
FIG. 3 is a diagram showing a turbine housing generating power according to an example of the instant disclosure.

FIG. 3 illustrates the continuous, nonstop electricity generation system 100 according to an example of the instant disclosure. In particular, FIG. 3 shows the turbine unit 300. FIG. 3 shows that the energy created from the one or more solar panels 102, 104 is provided to power the fans of the one or more wind motors that in turn spin and drive the one or more turbines 301 to generate and store power that may be used outside of the system 100.

FIG. 3 shows a turbine housing of the turbine unit 300 that may generate power that may be captured by a power cell and sent to a junction box at a home 302. A diagnostic unit, panel, or board 304 may be used to monitor operations of the system 100 and may send information and/or alerts to one or more computing devices such as a computing device associated with a service provider. The diagnostic panel 304 may receive instructions or commands from the service provider to adjust the system performance due to, for example, weather such as overcast weather. The diagnostic panel 304 is also able to switch from one malfunctioning solar panel, wind motor, or turbine to another and divert power accordingly and proportionally.

A number of turbines 301 may be determined based on a number of fans based on a desired output of the system 100. As an example, a home in Louisiana may require approximately 1273 kWh per month. As a result, a system 100 located in this region may be designed to deliver this output or greater. Each of the turbines 301 may spin based on wind power delivered from the fans of the one or more wind motors. Energy generated from the turbines 301 may be sent to the first battery 306 and/or the second battery 308 after being converted to energy that can be stored. The energy can be released to the home or business 302 after being converted to energy for use and passing through a regulator 322, e.g., a voltage meter. The voltage meter 322 may provide the electricity to the junction box of the home 302.

After the energy reaches a five-day capacity, the energy may be sent to the first battery 306 and/or the second battery 308 to store a three-day supply of energy. The system 100 may then determine how much of the energy may be supplied to the electrical grid based on upcoming weather patterns and information for a particular location or zip code of the system. As an example, if the battery has three days of capacity (e.g., a maximum capacity) and sunny weather is predicted over a next two days, the system may release one, two, or possibly three days of stored energy to the grid 316.

The release of the energy to the grid 316 may be based on the equation and formula shown below. At 11:59:59 PM each day, if first battery 306 is at _% capacity, and next day weather in zipcode _ is forecast to be _, and day two weather is _, and day three weather is _, then, _% can be released back to the grid.

Categories of Weather:
S—Sunny
MS—Mostly Sunny
PS—Partly Sunny
PC—Partly Cloudy
MC—Mostly Cloudy
C—Cloudy
R/S—Rain/Showers
S R/S—Scattered Rain/Showers
S—Snow
T—Thunderstorms
ST—Scattered Thunderstorms
11 categories=39,916,800 combinations As an example, there may only be energy in first battery 306 if the second battery 308 is filled to its five-day capacity. However, if the first battery 306 is filled to its three-day capacity (100%) and the next three days are forecast as S-Sunny days, then 100% of the first battery may be released to the grid. However, a different percentage also may be released such as one day of capacity (e.g., 33%) or two days of capacity (e.g., 67%).

The diagnostic unit or board 304 may have at least one computing device that executes an application to monitor performance of the system and send real-time information associated with the performance of the system to at least one server computing device. The application may also send the information and/or alerts associated with the system. In particular, the application may send information associated with malfunctions in the system such that a service technician may be deployed to the system 100 and perform any review or maintenance.

As shown in FIG. 3, each turbine 301 may have a turbine housing 312 that includes a nacelle 313 that is connected to one or more blades and a turbine generator line 314. The one or more turbines 301 of the turbine unit 300 may send and supply energy to the system battery 306 that may store a three day capacity and the unit battery 308 that may store a five day capacity. The system battery 306 may provide stored energy to an electrical grid 316. The energy may be provided using a gate or a switch.

FIG. 3 also shows that the turbine power may be sent to an inverter 318 that is charged using the inverter charger 320 using solar energy that is then stored in the unit battery 308. As an example, there may be a turbine generator line 314 for each turbine and all of the turbine generator lines 314 may combine into one supply to inverter 318 and the energy may be stored in the unit battery 308. Additionally, FIG. 3 shows that the energy in the unit battery 308 may be converted using an inverter 324 that is charged using an inverter charger 326 that may be powered with solar energy. The inverter 324 may provide the converted energy as electrical energy to the voltage meter 322 and provided to the house 302.

Figure 4:
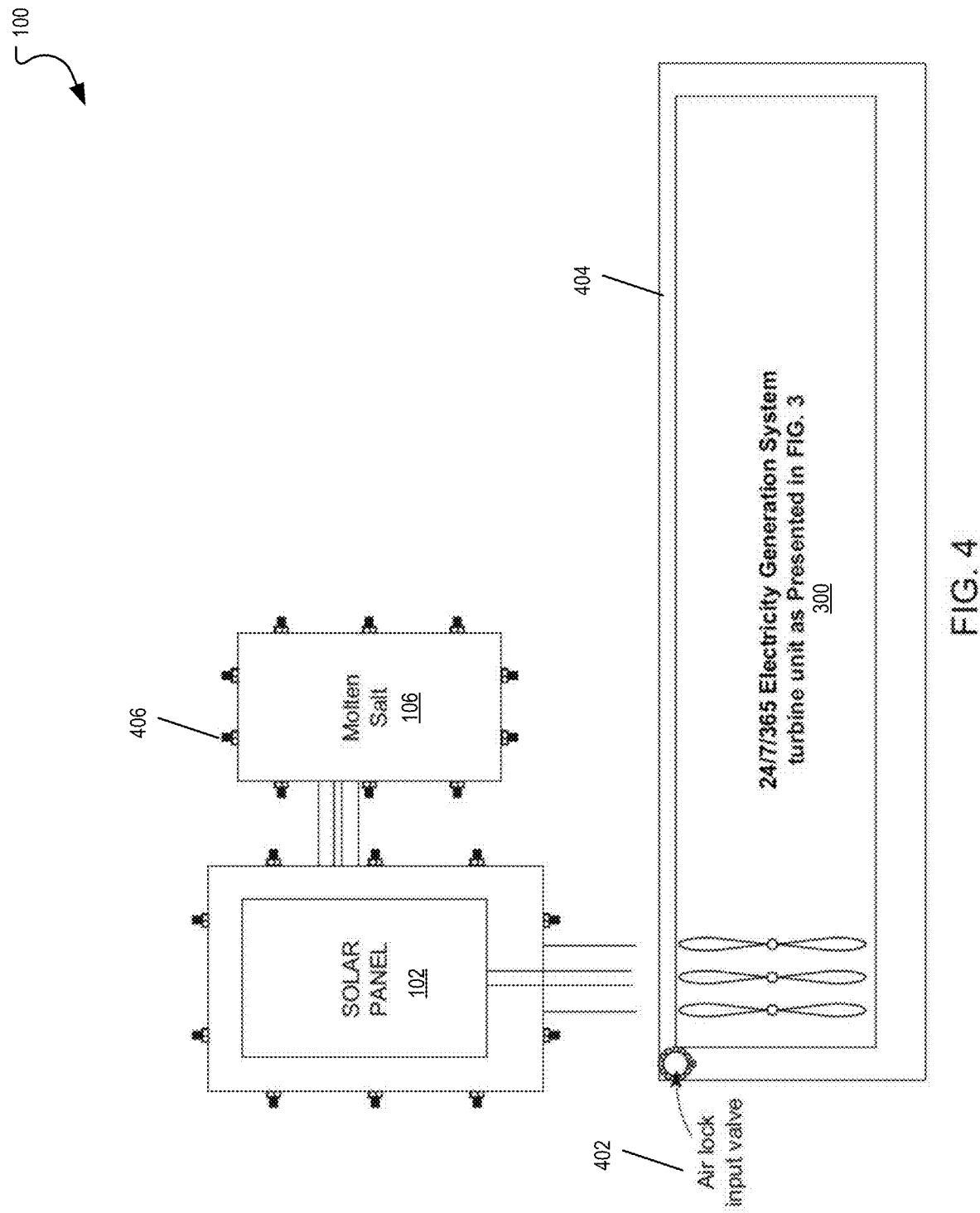
FIG. 4 is another diagram showing the turbine housing generating power and a return power coil according to an example of the instant disclosure.

FIG. 4 illustrates the continuous, nonstop electricity generation system 100 according to an example of the instant disclosure. In particular, FIG. 4 shows the turbine unit 300 that may be connected to one or more solar panels 102, 104 and one or more salt capture bins 106. FIG. 4 also shows an air lock input valve 402.

FIG. 4 shows a sleeve 404 that may be used to protect or house the system 100 in particular environments. The sleeve 404 may protect or house at least a part of the system as shown in FIG. 4. The sleeve 404 may be pressurized, e.g., a pressure-tight covering for harsh atmospheres such as environments away from Earth including the Moon and/or another planet such as Mars where there is a lack of oxygen. In one example, the sleeve may include materials similar to those found in a space suit with a plurality of layers that maintain a temperature and protect from debris and dust such as a thermal and micrometeoroid layer. Oxygen or air may be provided to the sleeve 404 via the airlock 402 to allow the system to function in environments with a different atmosphere. The one or more panels 102 may be protected with glass such as high-temperature quartz glass or another material that is generally transparent and structurally sound. The panel unit may be attached to a particular structure or surface using bolts 406 or another attachment device.

Figure 5:
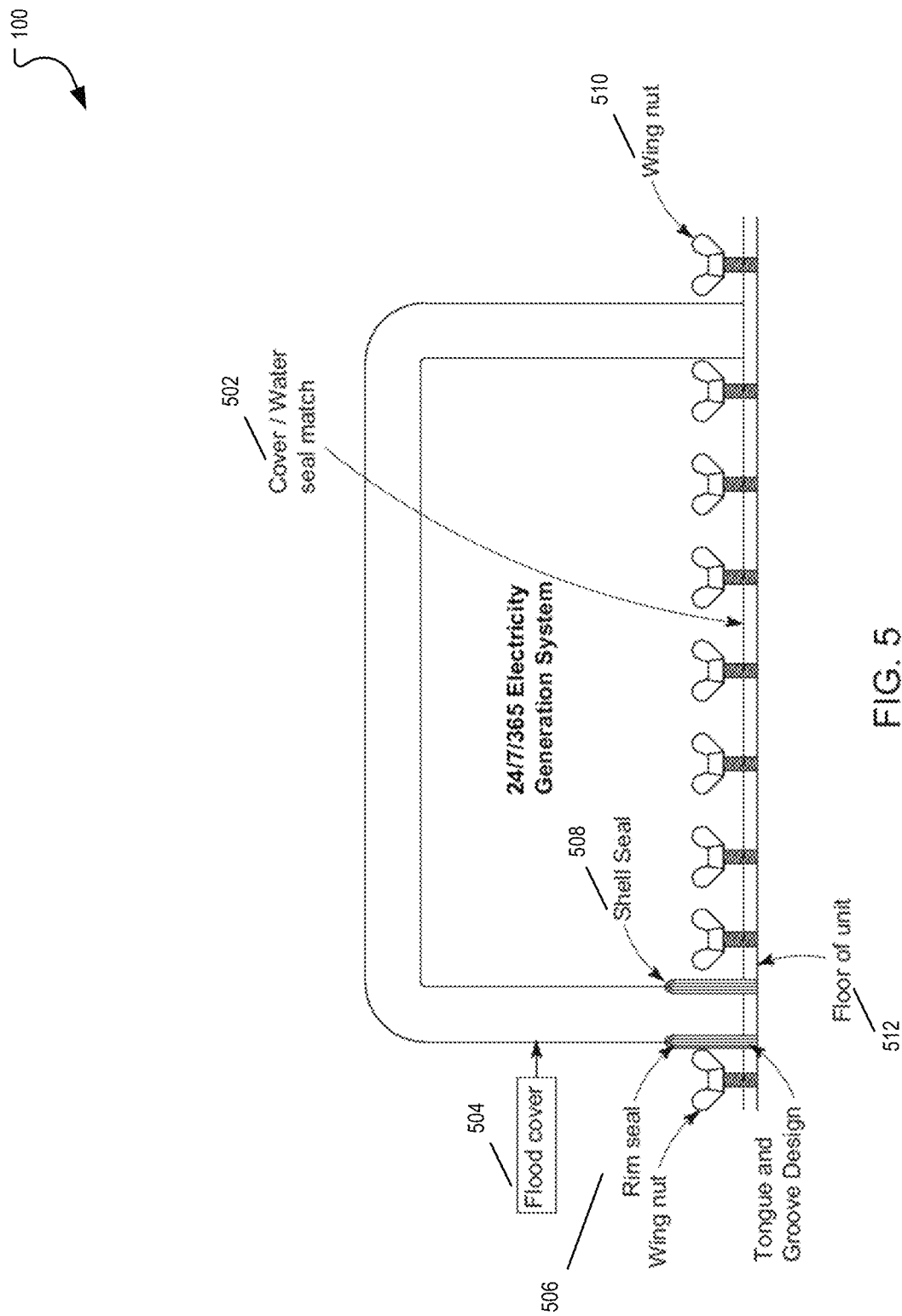
FIG. 5 is a diagram of the electricity generation system modified for aerospace use according to an example of the instant disclosure.

FIG. 5 illustrates the continuous, nonstop electricity generation system 100 according to an example of the instant disclosure. The system may have a cover and water seal match 502 that comprise a tongue and groove seal between a lid and floor of the system 100. This provides a first level of insulation from flooding water along with wingnuts 510. As shown in FIG. 5, the system 100 may have a flood cover 504 to protect the system 100. It is expected and/or anticipated that the system 100 may be utilized in areas that experience extreme weather and that the system may be flood resistant and/or fire resistant. The cover 504 may be similar to a hurricane shutter and may be placed over at least a portion of the system to protect from flooding conditions. The cover 504 may be sealed using one or more wingnuts 510 and may be set in place with tongue and groove seals that lock to keep liquid away from the system 100. FIG. 5 shows a rim seal 506 on an outer wall of the flood cover 504 and a shell seal 508 on an inner wall of the flood cover. The rim seal 506 may run approximately to a height of the cover. The wingnuts 510 may be used to attach a floor or other wall of the unit 512 to a surface.

Figure 6:
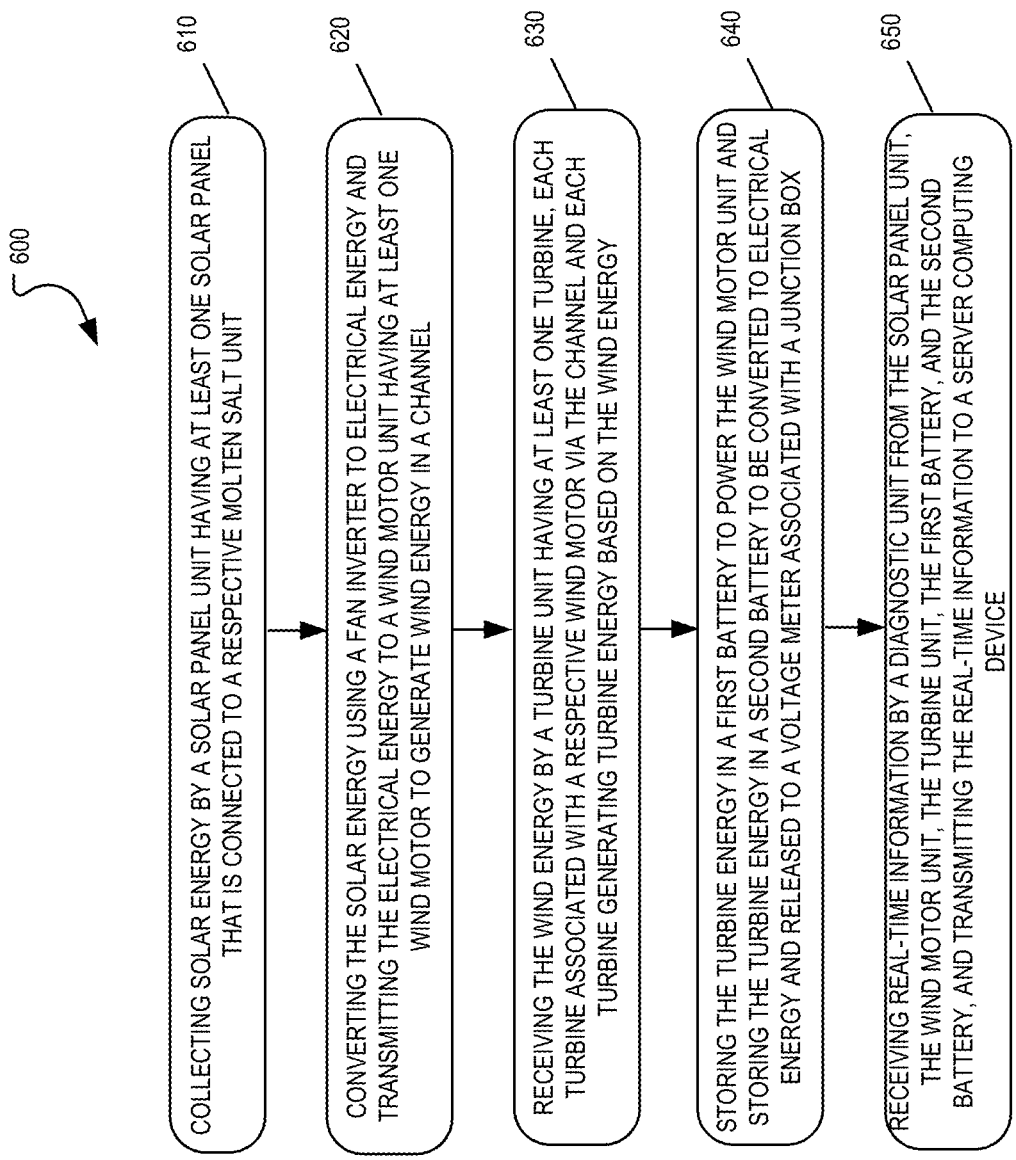
FIG. 6 is a flowchart of a method for generating electrical energy by the electricity generation system according to an example of the instant disclosure.

FIG. 6 illustrates an example method 600 of continuous, nonstop electricity generation by the continuous, nonstop electricity generation system 100 according to an example of the instant disclosure. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method 600 includes collecting solar energy by a solar panel unit having one or more solar panels that are each connected with a respective molten salt unit at block 610.

Next, the method 600 includes converting the solar energy using a fan inverter to electrical energy and transmitting the electrical energy to a wind motor unit having one or more wind motors to generate wind energy, each wind motor having a channel at block 620. Next, the method 600 includes receiving the wind energy by a turbine unit having one or more turbines. Each turbine may be associated with a respective wind motor via the channel and each turbine may generate turbine energy based on the wind energy at block 630.

Next, the method 600 includes storing the turbine energy in a first battery to power the wind motor unit and storing the turbine energy in a second battery to be converted to electrical energy and released to a voltage meter associated with a junction box at block 640. The method 600 may include receiving real-time information by a diagnostic unit from the solar panel unit, the wind motor unit, the turbine unit, the first battery, and the second battery. The diagnostic unit may transmit the real-time information to a server computing device using a network at block 650. In a further example, the method 600 may include obtaining real-time information from a diagnostic unit from the solar panel unit, the wind motor unit, the turbine unit, the first battery, and the second battery, and transmitting the real-time information to a server computing device using a network.

In a further example, the method 600 may include the server computing device transmitting the real-time information to a client computing device for display on a graphical user interface (GUI) on a display of the client computing device.

The server computing device may send instructions to the second battery to release the power to an electrical grid based on a weather forecast for a zip code associated with the system. The power released to the electrical grid may be based on a current battery percentage of the second battery, the weather forecast for the zip code for a first next day, the weather forecast for the zip code for a second next day after the first next day, and the weather forecast for the zip code for a third next day after the second next day. In addition, the power released to the electrical grid may be a particular battery percentage of the second battery.

According to an example, the weather forecast for the zip code may be one of Sunny, Mostly Sunny, Partly Sunny, Partly Cloudy, Mostly Cloudy, Cloudy, Rain/Showers, Scattered Rain/Showers, Snow, Thunderstorms, and Scattered Thunderstorms. In another example, the solar panel unit may include between four and eight solar panels, sixteen wind motors, and sixteen turbines. The first battery may be capable to store a three day energy supply for the system and the second battery is capable to store a five day energy supply for use outside the system. In addition, the second battery may provide electricity to a junction box in a structure. The first battery may provide electricity to a grid. The at least one solar panel may be located on a top of the structure or in another location. The channel may have a shape comprising one of a straight channel, a cornucopia channel, and a reverse cornucopia channel.

In a further example, the method 600 may include each solar panel generating a first number of Watts per hour based on a number of hours of sunlight, each wind motor uses a second number of Watts per hour such that the first number is greater than or equal to the second number, and each turbine generates a third number of kilowatts per hour (kWh) based on a speed of the respective wind motor such that the turbine unit generates a fourth number of kWh based on a number of turbines of the at least one turbine.

Figure 7:
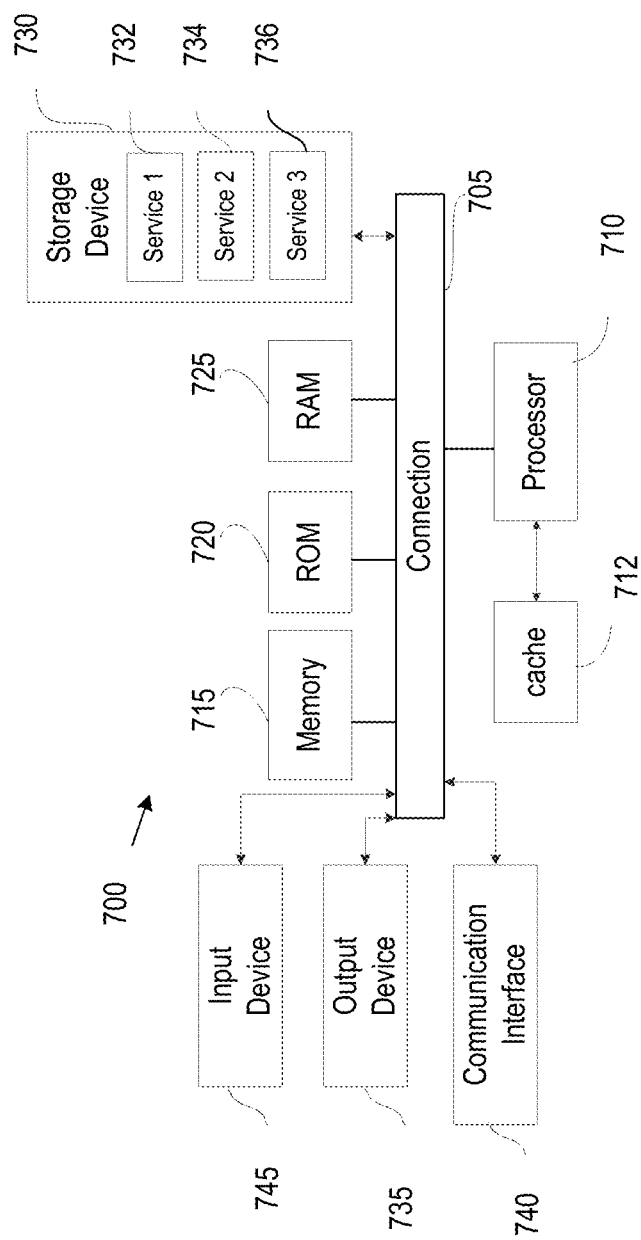
FIG. 7 shows an example of a system for implementing certain aspects of the present technology.

FIG. 7 shows an example of computing system 700, which can be for example any computing device making up the computing device 70 such as at least one server computing device or at least one client computing device, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A system comprising: a solar panel unit comprising at least one solar panel connected to a respective molten salt cell, a wind motor unit comprising at least one wind motor that is powered by the solar panel unit, each wind motor having a channel, a turbine unit comprising at least one turbine, each turbine associated with a respective wind motor via the channel, the turbine unit powered by the wind motor unit, a first battery receiving and storing power generated by the turbine unit to be used by the system, a second battery receiving and storing power generated by the turbine unit for use outside of the system, and a housing that protects at least the wind motor unit and the turbine unit.

Aspect 2: The system of Aspect 1, a diagnostic unit to obtain real-time information from the solar panel unit, the wind motor unit, the turbine unit, the first battery, and the second battery, the diagnostic unit to transmit the real-time information to a server computing device using a network.

Aspect 3: The system of Aspects 1 and 2, wherein the server computing device sends instructions to the second battery to release the power to an electrical grid based on a weather forecast for a zip code associated with the system.

Aspect 4: The system of Aspects 1 to 3, wherein the power released to the electrical grid is based on a current battery percentage of the second battery, the weather forecast for the zip code for a first next day, the weather forecast for the zip code for a second next day after the first next day, and the weather forecast for the zip code for a third next day after the second next day.

Aspect 5: The system of Aspects 1 to 4, wherein the power released to the electrical grid comprises a particular battery percentage of the second battery.

Aspect 6: The system of Aspects 1 to 5, wherein the weather forecast for the zip code comprises one of Sunny, Mostly Sunny, Partly Sunny, Partly Cloudy, Mostly Cloudy, Cloudy, Rain/Showers, Scattered Rain/Showers, Snow, Thunderstorms, and Scattered Thunderstorms.

Aspect 7: The system of Aspects 1 to 6, wherein the server computing device transmits the real-time information to a client computing device for display on a graphical user interface (GUI) on a display of the client computing device.

Aspect 8: The system of Aspects 1 to 7, wherein the solar panel unit comprises between four and eight solar panels, sixteen wind motors, and sixteen turbines.

Aspect 9: The system of Aspects 1 to 8, wherein the first battery is capable to store a three day energy supply for the system and the second battery is capable to store a five day energy supply for use outside the system.

Aspect 10: The system of Aspects 1 to 9, wherein the second battery provides electricity to a junction box in a structure.

Aspect 11: The system of Aspects 1 to 10, wherein the at least one solar panel is on a top of the structure.

Aspect 12: The system of Aspects 1 to 11, wherein the first battery provides electricity to a grid.

Aspect 13: The system of Aspects 1 to 12, wherein the channel has a shape comprising one of a straight channel, a cornucopia channel, and a reverse cornucopia channel.

Aspect 14: The system of Aspects 1 to 13, wherein each solar panel generates a first number of Watts per hour based on a number of hours of sunlight, each wind motor uses a second number of Watts per hour such that the first number is greater than or equal to the second number, and each turbine generates a third number of kilowatts per hour (kWh) based on a speed of the respective wind motor such that the turbine unit generates a fourth number of kWh based on a number of turbines of the at least one turbine.

Aspect 15: A method, comprising: collecting solar energy by a solar panel unit comprising at least one solar panel that is connected to a respective molten salt unit, converting the solar energy using a fan inverter to electrical energy and transmitting the electrical energy to a wind motor unit having at least one wind motor to generate wind energy into a channel, each wind motor having a channel, receiving the wind energy by a turbine unit comprising at least one turbine, each turbine associated with a respective wind motor via the channel, each turbine generating turbine energy based on the wind energy provided by the respective wind motor, storing the turbine energy in a first battery to power the wind motor unit and storing the turbine energy in a second battery to be converted to electrical energy and released to a voltage meter associated with a junction box, and receiving real-time information by a diagnostic unit from the solar panel unit, the wind motor unit, the turbine unit, the first battery, and the second battery and transmitting the real-time information to a server computing device.

Aspect 16: The method of Aspect 15, wherein the server computing device sends instructions to the second battery to release the power to an electrical grid based on a weather forecast for a zip code associated with the system.

Aspect 17: The method of Aspects 15 and 16, wherein the power released to the electrical grid is based on a current battery percentage of the second battery, the weather forecast for the zip code for a first next day, the weather forecast for the zip code for a second next day after the first next day, and the weather forecast for the zip code for a third next day after the second next day.

Aspect 18: The method of Aspects 15 to 17, wherein the power released to the electrical grid comprises a particular battery percentage of the second battery.

Aspect 19: The method of Aspects 15 to 18, wherein the weather forecast for the zip code comprises one of Sunny, Mostly Sunny, Partly Sunny, Partly Cloudy, Mostly Cloudy, Cloudy, Rain/Showers, Scattered Rain/Showers, Snow, Thunderstorms, and Scattered Thunderstorms.

Aspect 20: The method of Aspects 15 to 19, wherein the server computing device transmits the real-time information to a client computing device for display on a graphical user interface (GUI) on a display of the client computing device.

What is claimed is:

1. A nonstop continuous electricity generation system comprising:
    a solar panel unit having:
        at least one solar panel configured to collect solar energy and connected to an associated molten salt cell bin, the solar cell unit being configured to generate electrical energy;
    a wind power unit having:
        at least one wind motor that is powered by the electrical energy generated by the solar panel unit, each at least one wind motor having one or more fans for generating artificial wind energy, and a tube or channel having a first end and a second end, the one or more fans being disposed at the first end of the tube or channel;
   a turbine unit having:
      at least one turbine, each at least one turbine being associated with a respective wind motor via the second end of the tube or channel, in which the turbine unit is powered by the artificial energy generated by the wind motor unit, which in turn is powered by the solar panel unit;
   a first battery that receives and stores electrical power generated solely by the turbine unit and the wind power unit to be used by the system, wherein the first battery is conductively coupled to a city grid to enable excess electrical power not required by the system to be provided to the city grid;
   a second battery that receives and stores electrical power generated solely by the turbine unit for powering at least one of a home, a business, or an electric vehicle;
   a housing that protects at least the wind power unit and the turbine unit; and
   a diagnostic unit that is configured to obtain real-time information associated with the solar panel unit, the wind power unit, the turbine unit and the first and second batteries, as well as real-time usage information of the home, business or electric vehicle that receives and uses electrical power generated by the system, the diagnostic unit being further configured to monitor performance and adjust operating parameters of the system, including determining the amount of excess electrical power to be provided to the city grid, and wherein the system does not receive any electrical power from the city grid for operation, thereby enabling the system to be autonomous.

2. The system of claim 1, wherein the amount of electrical power released to the city grid by the first battery is determined by at least one factor that includes a predetermined percentage of the first and/or second battery, the weather forecast for a zip code associated with the system for a first next day, the weather forecast for the zip code for a second next day after the first next day, and the weather forecast for the zip code for a third next day after the second next day.

3. The system of claim 2, wherein the electrical power released to the city grid comprises a particular battery percentage of the second battery.

4. The system of claim 2, wherein the weather forecast for the zip code associated with the system comprises one of Sunny, Mostly Sunny, Partly Sunny, Partly Cloudy, Mostly Cloudy, Cloudy, Rain/Showers, Scattered Rain/Showers, Snow, Thunderstorms, and Scattered Thunderstorms.

5. The system of claim 1, wherein the diagnostic unit is configured to transmit collected real-time information to a server computing device that transmits the real-time information to a client computing device for display on a graphical user interface (GUI) on a display of the client computing device.

6. The system of claim 1, wherein the solar panel unit comprises between four and eight solar panels, the wind power unit comprises sixteen wind motors, and the turbine unit comprises sixteen turbines.

7. The system of claim 1, wherein the first battery is configured to store a three day energy supply for the system and the second battery is configured to store a five day energy supply for use outside the system.

8. The system of claim 1, wherein the second battery provides electricity to a junction box in a structure.

9. The system of claim 8, wherein at least one solar panel is on a top of the structure.

10. The system of claim 1, wherein each solar panel generates a first number of Watts per hour based on a number of hours of sunlight, each wind motor uses a second number of Watts per hour such that the first number is greater or equal to the second number, and each turbine generates a third number of kilowatts per hour (kWh) based on a speed of the respective wind motor such that the turbine unit generates a fourth number of kWh based on a number of turbines of the at least one turbine.

11. A method comprising:
   providing the system of claim 1;
   collecting solar energy by the solar panel unit;
   converting the solar energy using a fan inverter to electrical energy and transmitting the electrical energy to the wind motor unit having at least one wind motor to generate artificial wind energy into the tube or channel;
   receiving the artificial wind energy by the turbine unit via the tube or channel;
   storing a first portion of the turbine energy in the first battery to power the wind power unit; and
   storing a second portion of the turbine energy in the second battery to be converted into electrical energy and released to a voltage meter associated with a junction box wherein excess electrical energy created by the system is provided via the first battery to the city grid in which the amount of excess electrical energy is determined by the diagnostic unit.

12. The method of claim 11, wherein the electrical power released to the city grid is based on a current battery percentage of the first and/or second battery, the weather forecast for the zip code for a first next day, the weather forecast for the zip code for a second next day after the first next day, and the weather forecast for a third next day after the second next day.

13. The method of claim 12, wherein the weather forecast for the zip code comprises one of Sunny, Mostly Sunny, Partly Sunny, Partly Cloudy, Mostly Cloudy, Cloudy, Rain/Showers, Scattered Rain/Showers, Snow, Thunderstorms, and Scattered Thunderstorms.

14. The method of claim 11, wherein the server computing device transmits the real-time information collected by the diagnostic unit to a client computing device for display on a graphical user interface (GUI) on a display of the client computing device.

15. The method of claim 11, further comprising detecting and switching via the diagnostic unit one or more malfunctioning solar panels, wind motors, or turbines to another functioning and diverting power proportionally.

16. The method of claim 11, in which a portion of the electrical power stored in the first battery is used to additionally power the wind motors of the wind power unit.

17. The system of claim 1, wherein the wind power unit is disposed within a lid of the housing and in close proximity to the turbine unit.

18. The system of claim 17, wherein each tube or channel is disposed in the lid of the housing.

19. The system of claim 1, wherein the diagnostic unit is further configured to detect and switch from one or more malfunctioning solar panels, wind motors, or turbines to another and divert power proportionally.

* * * * *